May 23, 1939.  L. L. MELLOR ET AL  2,159,394

VARIABLE EQUIVALENT FOCAL LENGTH LENS

Filed June 9, 1936   7 Sheets-Sheet 1

Inventors
Lewis L. Mellor,
Arthur Zaugg.

Attorney.

May 23, 1939.   L. L. MELLOR ET AL   2,159,394
VARIABLE EQUIVALENT FOCAL LENGTH LENS
Filed June 9, 1936   7 Sheets-Sheet 2

Inventors
Lewis L. Mellor,
Arthur Zaugg.

Attorney.

May 23, 1939.  L. L. MELLOR ET AL  2,159,394
VARIABLE EQUIVALENT FOCAL LENGTH LENS
Filed June 9, 1936   7 Sheets-Sheet 3

Fig. 4.

Inventors
Lewis L. Mellor,
Arthur Zaugg.

Attorney.

May 23, 1939.   L. L. MELLOR ET AL   2,159,394
VARIABLE EQUIVALENT FOCAL LENGTH LENS
Filed June 9, 1936   7 Sheets-Sheet 6

Inventors
Lewis L. Mellor,
Arthur Zaugg.

Attorney.

May 23, 1939.   L. L. MELLOR ET AL   2,159,394
VARIABLE EQUIVALENT FOCAL LENGTH LENS
Filed June 9, 1936     7 Sheets-Sheet 7

Inventors
Lewis L. Mellor,
Arthur Zaugg.

Attorney.

Patented May 23, 1939

2,159,394

UNITED STATES PATENT OFFICE 2,159,394

VARIABLE EQUIVALENT FOCAL LENGTH LENS

Lewis L. Mellor and Arthur Zaugg, Los Angeles, Calif., assignors to Paramount Productions, Inc., Los Angeles, Calif., a corporation of Delaware Application June 9, 1936, Serial No. 84,304

13 Claims. (Cl. 88—57)

This invention relates to variable equivalent focal length objectives for motion picture cameras.

As is well known, the use of a variable equivalent focal length objective permits variation of the magnification of the image formed on the film during taking of a scene, so that the image of a given object or field may be made gradually to enlarge or diminish in dimensions on the film, giving the effect of moving the camera from a "long shot" position up to "close up", or vice versa.

Variable focal length lenses as heretofore known have been limited in usefulness by reason of insufficient "speed" throughout the entire range of magnification. A variable focal length lens involves two or more components, movable relatively to one another to accomplish the change in focal length. Obviously, the correction of a lens of this type presents great difficulty, since the corrections made must hold for all positions of the several components of the lens. Further, the difficulty here mentioned increases greatly when the object is to produce a relatively "fast" lens, that is, one of comparatively high relative aperture.

It may be stated as the primary object of the present invention to provide a variable equivalent focal length objective characterized by large relative aperture, as substantially f/2.7, throughout a range of magnification substantially as great as 1 to 3½, and which is corrected to an extent requisite for motion picture purposes throughout each range of use.

A further object of the invention is to provide improved means for automatically opening and closing the diaphragm of the objective as the focal length of the objective is lengthened and shortened, respectively, and also improved means for adjusting the relative aperture of the objective.

A disadvantage in certain variable equivalent focal length lenses of the prior art is that if the drive means for the relatively movable lens elements is manually operated at constant speed, the apparent rate of change of magnification of the image is variable, the image appearing to change in dimensions most rapidly at the shorter focal length end of the operating range of the lens.

An object of the present invention is to provide a drive means for the relatively movable elements of the objective so compensated as to cause the image to appear to increase or diminish in linear dimensions at a constant rate of speed, as though the camera were moved to or from the object at uniform velocity.

Various additional objects and features of the invention will appear and be made apparent from the following detailed description of a present preferred embodiment of the invention, reference for this purpose being had to the accompanying drawings, in which:

The lens elements and their optical characteristics will first be described, reference for this purpose being directed to Figs. 1 and 2.

The complete lens combination comprises a movable front divergent or negative member 10, and a positive or convergent back member consisting of two relatively movable components 11 and 12. Negative member 10 consists of a front lens made up of cemented positive and negative elements 13 and 14, respectively, and a back lens 15, said parts being fixed relatively to one another. Forward positive component 11 consists of a forward positive element 16, a negative middle element 17, and two positive back elements 18 and 19. Back positive component 12 consists of a lens made up of cemented positive and negative elements 20 and 21, respectively.

The optical data on this lens system is as follows: 40-140 mm. f/2.7 (all measurement in millimeters).

|  | Elements-radii | Thickness | Air space | $N_d$ | V | Glass |
|---|---|---|---|---|---|---|
| Front member 10 | 13 $r_1=+241.4$ $r_2=-119.0$ | 13.0 |  | 1.6485 | 33.7 | Flint. |
|  | 14 $r_3=+63$ | 4.0 | 10.5 | 1.5167 | 64.5 | Borosilicate crown. |
|  | 15 $r_4=+648.0$ $r_5=+114.0$ | 4.0 |  | 1.6485 | 33.7 | Flint. |
|  |  |  | 150-15.0 |  |  |  |
| Middle member 11 | 16 $r_6=+52.0$ $r_7=-350.0$ | 11.5 |  | 1.6174 | 55 | Dense barium crown. |
|  | 17 $r_8=-50.6$ $r_9=+78.6$ | 3.0 | 15.72 | 1.6485 | 33.7 | Flint. |
|  | 18 $r_{10}=+301.0$ $r_{11}=-112.0$ | 7.0 | 11.0 | 1.6174 | 55.0 | Dense barium crown. |
|  | 19 $r_{12}=-877.4$ $r_{13}=-70.2$ | 7.0 | 0.5 | 1.6174 | 55 | Do. |
|  |  |  | 10.0-165.0 |  |  |  |
| Back member 12 | 20 $r_{14}=\infty$ $r_{15}=-33.03$ | 10.0 |  | 1.5167 | 64.5 | Borosilicate crown. |
|  | 21 $r_{16}=-100.00$ | 10.0 |  | 1.6485 | 33.7 | Flint. |

In designing the lens, it was found necessary to use lens elements of comparatively large radius of curvature in order to accommodate the large diaphragm opening made necessary by the speed characteristics desired. Accordingly, to obtain necessary power with use of large radius curves, plural piece negative and positive components were found desirable. Thus, negative member or group 10 is made up of a front cemeneted component 13, 14 and a back component 15. Component 13, 14 is compound and meniscus in shape, with its concave surface $r_3$ directed toward the focal plane, being composed of a front bi-convex element 13 cemented to a rearward bi-concave element 14. In order to minimize distortion, the power of the concave surface $r_3$ should be at least substantially three and one half times the power of the convex surface $r_1$, the ratio being nearly four to one in the present illustration. Element 15 of the negative is a single lens, meniscus in shape, and is positioned with its concave surface $r_5$ facing the focal plane. Also to minimize distortion, the power of the concave surface $r_5$ preferably is made substantially at least five times the power of the convex surface, which is only slightly convex.

The flint glasses used in the negative member have high index and high dispersion, preferably $N_d$:1.6300 or greater, and V:35.0 or less. The crown glass of the negative has low index and low dispersion, preferably $N_d$:1.5230 or less, and V:60 or greater.

The focal length of the negative member 10 considered by itself is preferably numerically at least twice that of the short equivalent focal length of the entire lens system. In the present instance, the focal length of the negative is 110 mm.

The positive member of the system, which views the virtual image formed by the negative member or group, is divided into two parts or groups 11 and 12, of a combined power such as to give a focal length of 75 mm. or greater, being in the present instance approximately 82 mm., the total power being divided about equally between components 11 and 12. This splitting of the positive into two parts 11 and 12 provides the required power with long radius curves, thus accommodating the high aperture of the system, and the rear component of the positive is further designed and utilized to reduce chromatic magnification, and in this aspect may be referred to as a color compensator. It will become evident from the specification of the elements used in component 12 that this member functions as a color compensator aside from its additional function as a positive power element.

Elements 16 ($r_6$ and $r_7$) and 18 ($r_{10}$ and $r_{11}$) are bi-convex lenses, the weaker convex surface $r_7$ of element 16 facing the focal plane, and the stronger convex surface $r_{11}$ of element 18 facing the focal plane. It is also desirable, in order to accomplish good spherical correction of long focal length, that the power of $r_{11}$ of element 18 be substantially more than twice that of $r_{10}$. Element 19 ($r_{12}$ and $r_{13}$) is preferably meniscus in form, with its concave surface facing away from the focal plane. Element 17 ($r_8$ and $r_9$) is bi-concave, with its weaker concave surface $r_9$ facing the focal plane.

The rearward component 12 of the positive member of the system is compound and in the present instance is plano-convex, made up of a front plano-convex piece 20 cemented to a rear negative meniscus 21, though by making other suitable compensations the front plano surface might be made cancave or weakly convex.

The flint glasses used in the negative pieces 17 and 21 of the positive have high index and dispersion, preferably $N_d$:1.6300 or greater, and V:35.0 or less.

The barium crown glasses used in positive pieces 16, 18 and 19 of the positive have high index and high dispersion, preferably $N_d$:1.6000 or greater, and V:56.0 or less. The positive piece 20 of the positive, however, has low index and low dispersion, preferably $N_d$:1.5253 or less, and V:60.0 or greater.

Neither the negative member 10, nor the positive members 11, 12, taken alone are corrected independently of the balance of the system, the system having been corrected in its entirety rather than by parts. For example, the negative combination 10 has a chromatic over-correction numerically equal to approximately one percent of its focal length, and has a considerable over-correction in spherical aberration at the higher apertures, these over-corrections being balanced by corresponding under-corrections in the positive members.

Use of a negative component 10 of a focal length as high as 110 mm. with a positive combination as strong as approximately 80 mm. enables satisfactory spherical and astigmatic correction for the system, and it is for this reason that it has been stated above that the focal length of the negative should be at least twice the equivalent short focal length of the entire system.

The two elements 18 and 19 are used in the positive instead of a single lens of the same total power at that point, in order to correct for spherical aberration at long focal lengths, the angle of incidence of the extreme rays of the light at long focal length and high aperture being exceedingly large and troublesome with use of a single lens instead of the two as shown. This condition of spherical aberration at long focal length would also be corrected by splitting lens 16, at the left of the negative element 17, into two weaker lenses of the same total power, using for instance, a single lens in place of the two at 18, 19; and such a lens arrangement comes within the broad scope of the present invention. Splitting of the element to the right of the negative 17, so as to form the two elements 18 and 19, as shown in the illustration, is of particular advantage, however, in that $r_{10}$ of element 18 can be changed to correct the spherical aberration for long focal length without appreciably affecting corrections for spherical and other aberrations already made for the short focal length position of the lens.

It will be noted that all barium glasses used in the positive member 11 of the system are of high index and high dispersion, which enables correction for spherical aberration for short as well as long focal length, while element 20 of component 12 is of borosilicate crown of low index and low dispersion. Use of such a glass for element 20 has the effect of reducing overall coma at long focal lengths.

Figure 1:
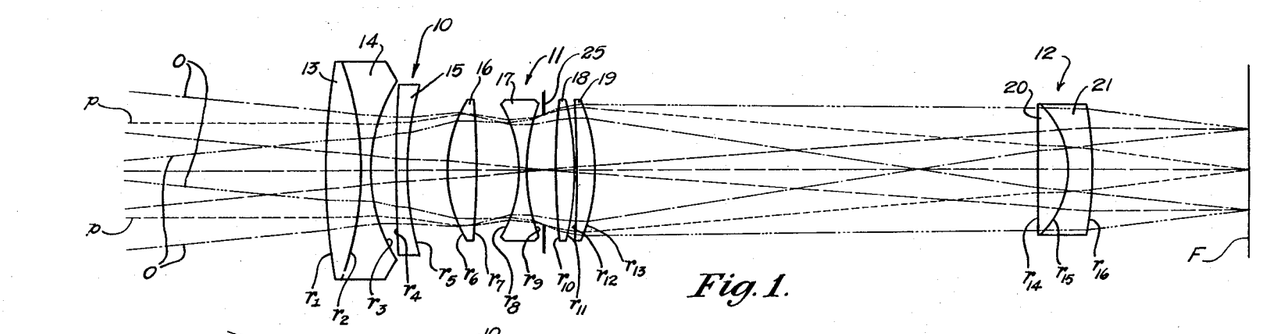
Fig. 1 shows the lens elements of the present invention moved to their long focal length limit.
Figure 2:
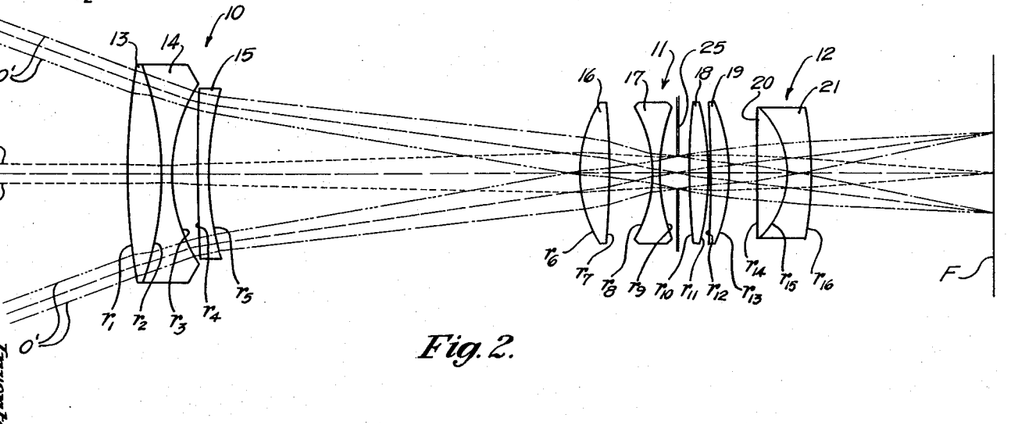
Fig. 2 shows the lens elements of the invention moved to their short focal length limit.

The effective aperture of the lens is determined by variable diaphragm 25, here shown as located in positive member 11 between elements 17 and 18, as illustrated in Figs. 1 and 2. In order that the aperture ratio shall be constant throughout the focal length range of the lens, it becomes necessary to open the diaphragm wider in proportion to increase in focal length as is well understood, and Figs. 1 and 2 shows the diaphragm at its two proper settings for short and long focal lengths at f/2.7.

The largest parallel beams capable of passing through the system at long and short focal lengths, operating at substantially f/2.7, are indicated at $p$ and $p'$ in Figs. 1 and 2, respectively, and said figures show the path of the parallel light beam passing through the system and coming to a focus at the focal plane F in each instance. Oblique light beams, of the same diameter as the parallel beams traced, are also shown, being indicated at $o$ and $o'$ in Figs. 1 and 2 respectively.

The lens system with the optical characteristics as described is capable of use with an aperture as high as f/2.7 throughout a focal length range of 40 to 140 mm., being corrected for an aperture ratio of f/2.7 at both short and long focal length for spherical aberration, distortion, chromatic aberration, curvature of field, astigmatism, coma and axial chromatic magnification. It is of course not possible to make these corrections absolutely perfect for both long and short focal length, but such compromises have been reached that the various usual aberrations are suitably corrected for motion picture work throughout the focal length range named and at an aperture as high as f/2.7.

Consideration of well understood lens theory reveals that the focal length of the system lengthens as negative member 10 and the positive component 11 are moved toward each other, and that the focal length of the system also lengthens by movement apart of the two components 11 and 12 of the positive member. The movement of the lens members to lengthen focal length may therefore include a relative movement toward one another of negative member 10 and the front component 11 of the positive, combined with a relative movement apart of the front and back components 11 and 12 of the positive.

As will be evdent to those skilled in the art, the movements involved in a lens system bodying three relatively movable members to effect continuous uniform change of focal length are not unique because of the two variable separative distances between the three components of the system. However, one particular relationship of movements between the several components is of advantage in the present lens system for certain mechanical reasons, and is here adopted as preferable, though without necessary limitation on the broader aspects of the invention.

Figure 3:
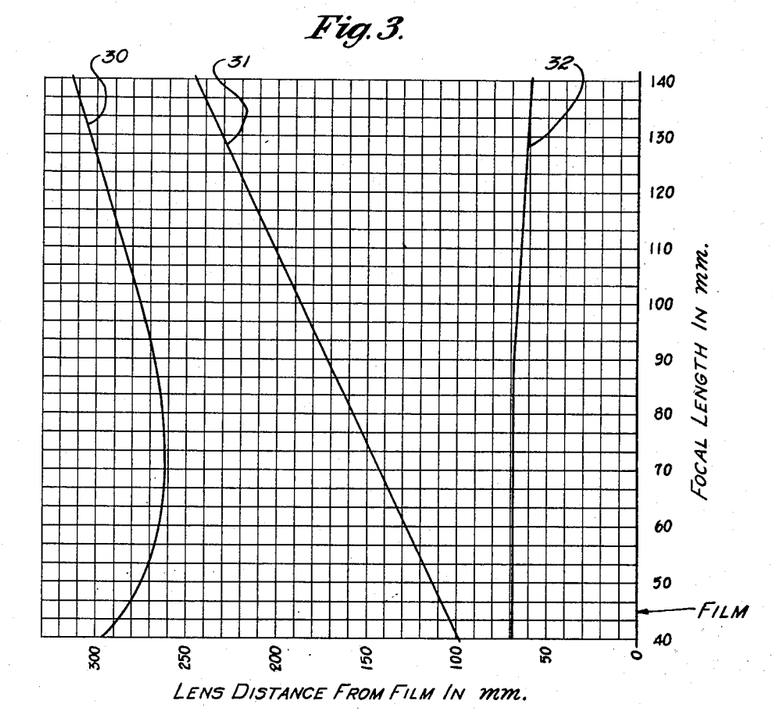
Fig. 3 is a chart showing the lens movements in travelling between the positions of Figs. 1 and 2.

These preferred movement characteristics are shown in the chart of Fig. 3, in which distances of the back surfaces of the several lens members 10, 11 and 12 from the focal plane are plotted against equivalent focal lengths of the system, giving curves 30, 31 and 32 representing the movements of members 10, 11 and 12, respectively, as the focal length of the system is changed from 40 to 140 mm. As will be evident from the chart, in moving to lengthen the focal length of the system, positive member 11 is caused to travel linearly away from the focal plane, negative member 10 moves first toward the focal plane and then recedes from it, moving, however, at all times relatively toward the positive component 11, while positive component 12 is at first stationary, and then moves toward the focal plane. It will be evident that during lengthening of the focal length, the separative distance between 10 and 11 continually decreases, while the separative distance between 11 and 12 continually increases, both changes acting to increase the focal length of the system.

As previously indicated, the movement of component 11 is preferably of a linear nature. The movement of negative member 10 is made to follow a smooth curve, as indicated in the chart, such as may be derived from a suitable smooth curved cam. The movement of lens member 12 is then calculated to be such, with reference to the movements of members 10 and 11, as will give a rate of increase of focal length which is in direct proportion to the linear movement of the front positive component 11; and in the present instance, to accomplish this end, rear positive component at first stands still, and then moves toward the focal plane, this characteristic movement being derived from a suitably formed cam.

The optical data given above specifies that at a focal length of 140 mm., the separative distances between the front and middle groups and between the middle and back groups are 15 mm. and 165 mm., respectively, and at 40 mm., these separative distances are 150 mm. and 10 mm., respectively. Thus for such focal length limits, it may be stated that the spacing between the front and middle groups is typically variable from a distance approximately one-third the short focal length of the system at long focal length to a distance approximately slightly greater than the long focal of the system at short focal length, and the spacing between the middle and back groups varies from a distance approximately slightly greater than the long focal length of the system at long focal length to a distance approximately one-quarter of the short focal length of the system at short focal length. It will of course be understood, however, that this holds only for a particular focal length range, and that for different focal length ranges, the spacing distance variations are modified accordingly.

The case and mechanical carriage for the lens system, as well as the means for moving the lens components as heretofore set forth, will now be described.

Figure 4:
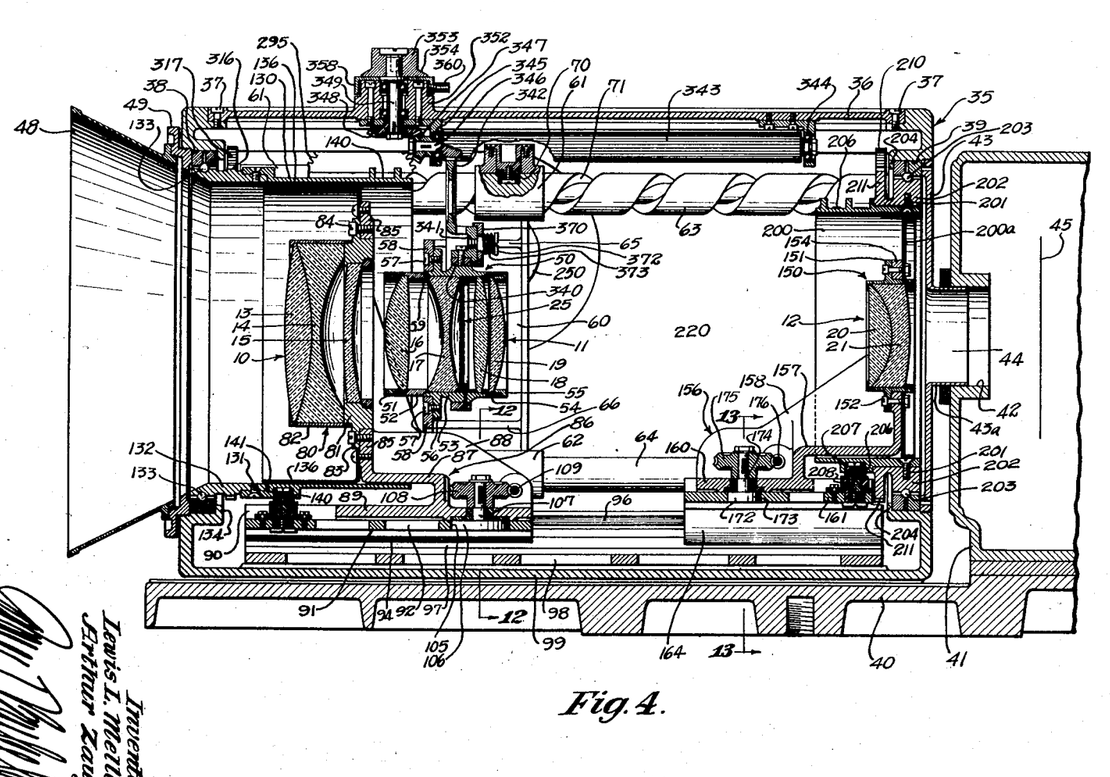
Fig. 4 is a vertical longitudinal section of the lens box, showing the lens elements and the carriage and operating mechanism.

Numeral 35 designates an elongated casing having a removable top wall 36 fastened in place as by screws 37, and provided with relatively large circular openings 38 and 39 in its front and rear end walls, respectively. Casing 35 is shown as resting on a supporting table 40, which is shown as extended rearwardly to support the camera, the front end portion of which is indicated in Fig. 4 at 41. The casing 35 and camera 41 are so supported on table 40 that circular openings 38 and 39 are coaxial with the lens mount aperture 42 of the camera. A circular closure plate or disk 43 is screwthreaded within the outer end of circular opening 39, and has a rearward extension 43a defining a light opening 44 and provided with a light tight fit with the forward end of the camera around its aperture 42. The focal plane of the camera, designated at 45, is located opposite opening 44 and aperture 42.

A conical sun shield 48 is carried by a ring 49 screw-threaded into the outer end of circular opening 38 at the forward end of the casing.

The previously described relatively movable lens members 10, 11 and 12 are indicated in Fig. 4 by the same reference numerals, and are shown as mounted on an optical axis coincident with the axis of casing openings 38 and 39.

The lens elements composing middle lens member 11 are carried by a lens mount 50 made up of lens carrier rings 51, 52, 53, 54 and 55, screwthreaded together as shown, ring 53 of this mount being provided with an external annular flange 56 which is connected by screws 57 to a laterally extending carriage plate 58 provided with an opening 59 through which the lens mount is received. This plate 58 extends laterally from a carriage member 60 (see Fig. 6) provided with top and bottom with perforated lugs 61 and 62 slidably mounted on upper and lower longitudinally running horizontal shafts 63 and 64, respectively. Lens carriage plate 58 is braced top and bottom by horizontal ribs 65 and 66 joining said plate with carriage member 60. Upper shaft 63 is journaled at its two ends in bearings 67 and 68 mounted on the end walls of the case, while lower shaft 64 is rigidly mounted on the end walls of the casing in any suitable manner.

Figure 5:
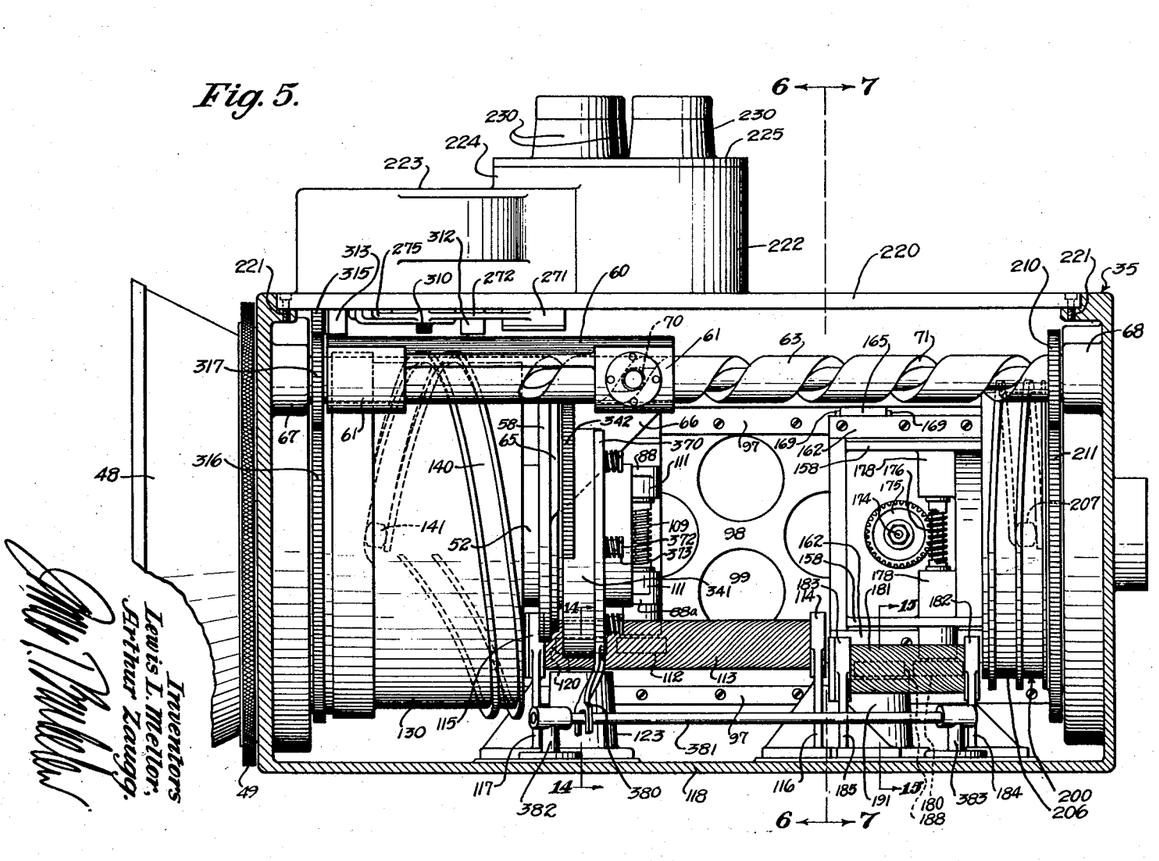
Fig. 5 is a plan view of the device shown in Fig. 4, with the cover plate and parts mounted thereon removed.

As shown in Fig. 5, lens carriage 60 has two perforated lugs 61 spaced longitudinally on shaft 63. The rearward one of these lugs 61 is provided with a roller 70 engaging in a spiral groove 71 cut in shaft 63 (see Fig. 4). It will be evident that rotation of shaft 63, accomplished in a manner later to be described, will act through roller 70 and lug 61 of the lens carriage to move said carriage and the lens member 11 along the optical axis of the lens system.

The lens elements of front lens member 10 are supported by a lens mount 80 consisting of a mounting ring 81 and a sleeve 82 screwthreaded thereto, ring 81 having an external annular flange 83 affixed as by screws 84, to the annular member 85 of a lens carriage generally indicated at 86. This carriage 86 has a portion 87, braced by ribs 88 and 88a, extending rearwardly below lens mount 50, and supported on dove-tailed slide member 89 movable in a way defined by longitudinally extending guide members 90 and a supporting plate 91 to which members 90 are fastened down. This supporting member 91 may be apertured for lightness, as indicated for instance at 92 in Fig. 4. Member 91 is provided at its longitudinal edges with brackets 94 (see Fig. 6) supporting cylindrical rods 95 which slide in ways 96 in slide bearing members 97 mounted on a supporting plate 98 fastened to the bottom wall 99 of the exterior casing, all as clearly shown in Fig. 6. Rods 95 are shown as secured against longitudinal movement with reference to members 94 by means of pins 100 set into members 94 and engaging the ends of rods 95. Plate 91 may be considered a part of lens carriage 86, so that the lens carriage as a whole is slidable in slide bearings 97 affixed to the case, while the lens supporting part of the carriage is slidable, for adjustment purposes only, on carriage slide member 91.

Means are provided for adjusting the longitudinal position of the lens carrying part of the carriage with reference to lower slide member 91, this adjustment being for focusing purposes, as later to be more fully described. For this purpose, a transverse slot 105 is formed in a rearward portion of a supporting plate 91, and operating in this slot is an eccentric 106 which is on the lower end of a shaft 107 journalled in slide member 89 and carrying on its upper end a worm wheel 108. This worm wheel 108 is driven by a worm gear 109 on a shaft 110 journalled in bearings 111 mounted on the rearward end of plate 89. One end of this shaft 110 carries a spiral gear 112 which meshes with the lower side of a long spiral gear 113 extending longitudinally of the casing and journalled at its ends in bearings 114 and 115 mounted on brackets 116 and 117, respectively, secured to the side wall 118 of the casing (see Fig. 5). Also meshing with the lower side of this spiral gear 113 is a spiral gear 120 mounted on a shaft 121 journalled in a bearing 122 carried by a tubular member 123 mounted in the side wall 118 of the casing, outer end 125 of this shaft being squared to be drivingly engaged by a manual operating crank, not shown.

It will be evident that rotation of shaft 121 as by means of a suitable crank, will cause rotation of spiral gears 120, 113 and 112 to rotate worm gear 109 and thereby drive worm wheel 108 to rotate eccentric 106 in transverse slot 105, this action causing relative translation of slide member 89 in which the shaft of the eccentric is journalled with reference to the plate 91 against which the eccentric operates, thus adjusting the longitudinal position of lens component 10 with reference to the lower or base plate 91 of the carriage.

In this adjustment operation, the spiral gear 112 meshing with spiral gear 113 has a motion of translation as well as relative rotation with reference to gear 113. When the carriage for lens 10 moves longitudinally in the casing during change of focal length, with supporting member 90 and parts carried thereby sliding longitudinally in way 97, spiral gear 112 also has a motion of translation with reference to the long spiral gear 113, but since in this instance gear 112 is not being rotated, its translation movement causes gear 113 to operate and to drive crankshaft 121, gear 113 and crankshaft 121 thus simply idling at this time. As will be evident, gear 113 must be made of sufficient length to accommodate the full range of longitudinal movement of the carriage for lens member 10.

Surrounding lens member 10 and the forward portion of lens carriage 86 is a drum 130, the forward end of which is fastened, as by screws 131, to an annular member 132 journalled in a bearing 133 mounted in casing opening 38 and confined between shoulder 134 and the inner side of ring 49, as clearly shown in Fig. 4. A light shield 136 is mounted on the annular portion 85 of lens carriage 86 and has a light tight engagement with the inner surface of drum 130.

The exterior of drum 130 is provided with a cam groove 140, formed in accordance with the characteristics of curve 30 of Fig. 3. This cam groove is engaged by a cam follower member 141, preferably of an outline such as indicated in Fig. 5, pivotally mounted on and extending upwardly from the forward end of the previously described lens carriage supporting plate 91 (Fig. 4). It will be evident that rotation of cam drum 130 will act through follower 141 and supporting plate 91 to effect longitudinal translation of the carriage for lens member 10. The means provided for rotation of cam drum 130 will be described at a later point in the specification.

The rear member 12 of the lens system is mounted in a lens mount 150 provided with an external annular flange 151 which is affixed, as by screws 152, to an annular portion 154 of a lens carriage member 156.

Figure 7:
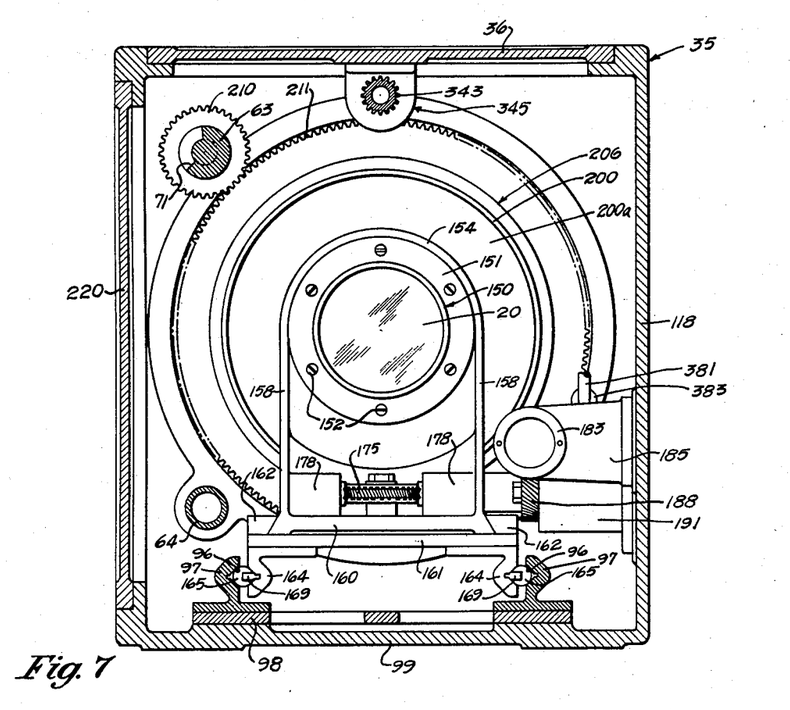
Fig. 7 is a vertical transverse section taken as indicated by arrows 7—7 on Fig. 5.

Carriage 156 has a part 157 extending forwardly from annular portion 154 and braced by ribs 158, carriage part 157 terminating in a dovetailed slide member 160 (see Figs. 4 and 7) slidable on a supporting plate 161 and guided by guide members 162 fastened to member 161. Secured to the under side of supporting plate 161 are brackets 164 supporting cylindrical slide rods 165 which are slidable in the previously described ways 96 in slide bearings 97. Slide rods 165 are confined against endwise movement with reference to brackets 164 by means of pins 169 engaging the ends of rods 165 and set into brackets 164. The carriage for lens member 12 may be considered as including slide or base plate 161, the upper portion of the carriage being longitudinally slidable for adjustment purposes on member 161, and the carriage as a whole being longitudinally slidable within the case, so as to move lens member 12 along its optical axis.

Means are provided for adjusting the position of the upper portion of the lens carriage on its supporting or slide member 161, said means being similar to the means provided for adjustment of the slide member 89 of the carriage for lens member 10 on its supporting plate 91. Thus, an eccentric 172 works in a transverse slot 173 formed in supporting plate 161, said eccentric being on a shaft 174 journalled in slide member 160 and driven by a worm wheel 175, said worm wheel 175 being driven by a worm gear 176 on a shaft 177 journalled in bearings 178. On one end of shaft 177 is a spiral gear 180, which meshes with the lower side of a long spiral gear 181 journalled at its ends in bearings 182 and 183 mounted on brackets 184 and 185, respectively, supported on side wall 118 of the case. Also meshing with the lower side of spiral gear 181 is a spiral gear 188 mounted on a shaft 189 journalled in bearings 190 mounted in a tubular member 191 extending through casing wall 118, the exterior end 192 of shaft 189 being squared to receive an operating crank, not shown. Rotation of shaft 189 by means of a suitable manual crank drives spiral gears 188, 181 and 180 to drive worm 176 and worm gear 175, thereby rotating shaft 174 and eccentric 172 to move slide member 160 longitudinally with reference to supporting plate 161. This operation thus adjusts the longitudinal position of the lens carrying parts of the carriage with reference to the supporting plate 161, which in turn is slidable longitudinally of the casing in slide bearings 97.

Surrounding lens member 12 and the rearward portion of carriage 156 is a cam drum 200, said drum being secured, as by screws 201, within an annular member 202 journalled within a bearing 203 confined between shoulder 204 and the previously mentioned closure plate 43. A light excluding shield 200a is mounted on lens supporting part 154 and slidably fits the interior of drum 200. The exterior surface of cam drum 200 has a cam groove 206, engaged by a follower member 207 (Figs. 4 and 5) pivotally mounted on a stud 208 mounted on the rearward end of supporting plate 161. Cam groove 206 is formed in accordance with the characteristics of curve 32 of Fig. 3.

Cylindrical cam drum 200 is rotated by means of a spur gear 210 mounted on shaft 63 and meshing with a large spur gear 211 formed integrally with the previously mentioned annular member 202 which carries the cam drum.

The means for driving shaft 63, which operates lens members 11 and 12, and also cam drum 130 which operates forward lens member 10, will now be described.

The side wall 220 of the case is shown as removable, being fastened in place as by screws 221. This side wall member 220 is formed with an outwardly extending portion 222, provided with a vertical closure wall 223 (see Fig. 8). Extending outwardly from this wall 223 is a cylindrical wall or annular flange 224, closed by a plate 225 secured to the outer end of wall or flange 224 as by screws 226, thus forming an enclosure 227 for certain gear members later to be described.

Figure 8:
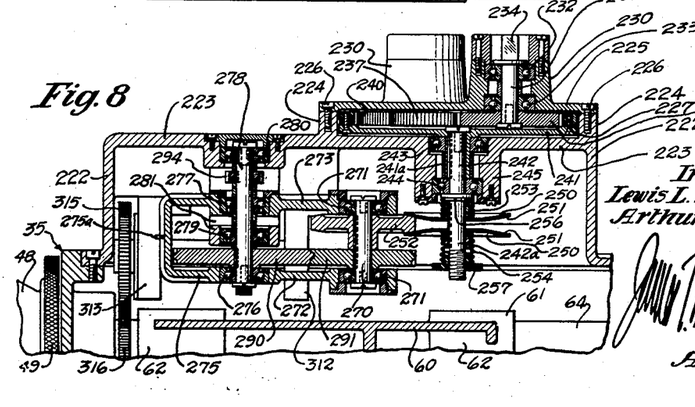
Fig. 8 is a section taken on broken line 8—8 of Fig. 9.

Closure plate 225 has three tubular extensions 230, one of which appears in section in Fig. 8. Extending through each of these tubular extensions 230, of which the one appearing in section of Fig. 8 is a typical example, is a shaft 231 journalled in bearings 232 and 233, the outer end of said shaft having a squared end 234 adapted to be engaged by a manual crank. These three shafts 231 extend within the previously mentioned enclosure 237, and have mounted on their inner ends, within said closure, spur gears 236, 237, respectively, of different diameters, affording three different speed ratios, all meshing with an internal gear 240. Gear 240 is mounted on a disk 241, which is provided with a central tubular portion 241a keyed on a shaft 242. Tubular member 241a and shaft 242 are journaled in bearings 243 and 244, respectively, mounted in a tubular member 245 extending inwardly from wall 223.

Splined on the outer portion 242a of shaft 242 is a pair of friction disks 250 having outwardly inclined portions 251 engaging correspondingly inclined side surfaces of a friction wheel 252. Disks 250 are pressed into pressural engagement with friction wheel 252 by means of coil springs 253 and 254 encircling shaft portion 242a and seating respectively against a flange 256 formed on the shaft adjacent bearing 244 and a nut 257 screw-threaded on its outer end.

Rotation of either of the three shafts 231 by a manual crank thus acts through the corresponding gear 236, 237 or 238, as the case may be, to drive internal gear 240 and shaft 242 to rotate the friction disks 250. These disks, spring pressed against the side surfaces of friction wheel 252, drive said wheel accordingly. It will be evident that the friction wheel 252 may be driven at any one of three different speeds for a given speed of operation of the manual crank, depending upon which of the three shafts is selected for direct drive by the crank.

Friction wheel 252 is keyed on a shaft 270 journalled in bearings 271 carried by the two arms 272 and 273, respectively, of a pivoted friction wheel carriage 275. This carriage 275 is journalled by means of bearings 276 and 277 on a shaft 278, which in turn is supported by bearings 279 and 280, the former supported by an arm 281 extending from casing wall 223, and the latter being supported in the casing wall as clearly indicated in Fig. 8.

Figure 9:
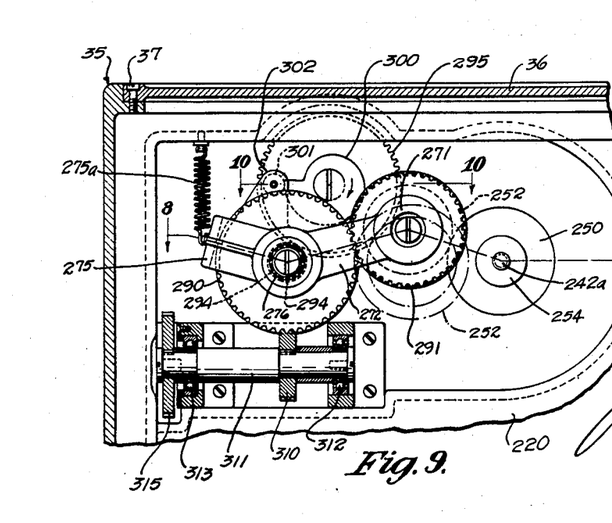
Fig. 9 is a section taken on broken line 9—9 of Fig. 6.
Figure 10:
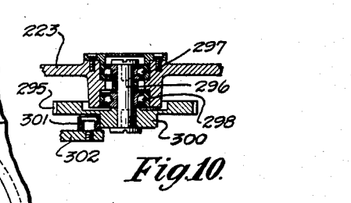
Fig. 10 is a detail section taken on line 10—10 of Fig. 9.
Figure 11:
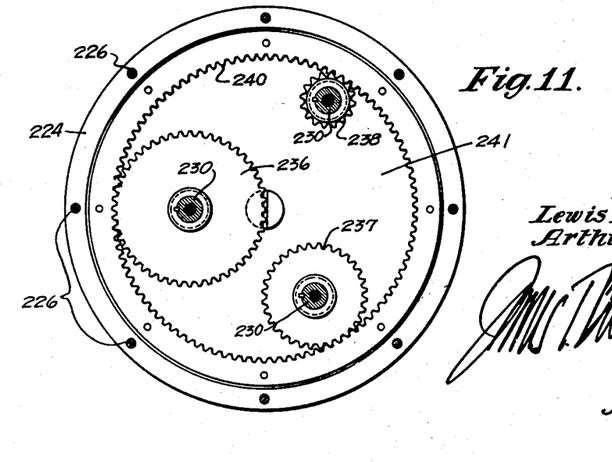
Fig. 11 is a detail section taken on line 11—11 of Fig. 6.

Keyed on shaft 278, between bearings 276 and 279, is a spiral gear 290, which is driven by a spiral gear 291 keyed on the previously described shaft 270. Shaft 278, thus driven from friction wheel 252 through spiral gears 290 and 291, has keyed thereon a spur gear 294 which meshes with a spur gear 295 (Figs. 9 and 10) mounted on a shaft 296 journalled in bearings 297 and 298 carried by wall 223. Integrally formed with gear 295 is a cam 300, the peripheral cam surface of which operates on a follower roller 301 carried by the extremity of an arm or extension 302 of friction wheel carriage 275. Carriage 275 is held with its follower roller 301 in engagement with cam 300 by means of a coil spring 275a connected between the carriage and the wall of the casing.

Gear 290 meshes at the bottom with a spiral gear 310, driving a shaft 311 journalled in bearings 312 and 313. This shaft 311 carries a spur gear 315 which meshes with a spur gear 316 formed on the periphery of the annular member 132, described previously. The previously described screw shaft 63 has mounted thereon a gear 317 meshing with and driven by a gear 316 (Fig. 5).

The complete operation of the driving mechanism is as follows:

When it is desired to change the focal length of the lens system, a manual crank is engaged with one of the shafts 231 of the drive mechanism, depending upon the rate of speed at which the change in focal length is to be made. The parts are shown in the drawings at long focal length position, and it will be assumed that it is desired to move the lens members of the system to short focal length position. A selected shaft 231 is engaged and rotated by the crank, and operates through the spur gear on its inner end, internal gear 240, shaft 242 and friction disk 250 to drive friction wheel 252. The parts being initially in long focal length position, cam 300 is in such position as to hold friction wheel carriage 275 against coil spring 275a in the position illustrated in Fig. 9, in which position the carriage has been rocked on its axis to increase the radius at which the friction disks 250 drivingly engage wheel 252, so that the rate at which wheel 252 is driven by the disks is at this time at its maximum. Friction wheel 252 drives shaft 270 and spiral gear 291, which drives spiral gear 290. Gear 290 drives spiral gear 310 on shaft 311, and spur gear 315 on shaft 311 drives spur gear 316, which turns annular member 132 and cam drum 130 operating lens member 10, and which also drives gear 317 on screw shaft 63, which in turn drives the carriage for lens member 11 through follower 70 engaging in the spiral groove of screw shaft 63, as well as driving the carriage for lens member 12 through gears 210 and 211, and cam drum 200. The cam grooves 140 and 206 of the two cam drums 130 and 200 being shaped in accordance with the curves 30 and 32 of Fig. 3, and the pitch of screw shaft 63 being such as to correspond with the characteristic line 31 of that figure, it will be evident that the lens members will be driven from their long focal length position to their short focal length position in accordance with the characteristics established by said curves.

While the lens members are so being moved by the gear train as thus described, shaft 278 on which spiral gear 290 is keyed (Fig. 8) is driving spur gear 294 in mesh with spur gear 295 which turns cam 300. Starting with the long focal length position of Fig. 9, the effective radius of this cam decreases as the mechanism travels to move the lens system to short focal length position. Now it will be evident that as the radius of the cam decreases, the friction wheel carriage, under the influence of spring 275a, will swing in a clockwise direction, as viewed in Fig. 9, and in such movement the point of frictional engagement between friction disk 252 will move inwardly toward the center of the friction disks, thus decreasing the speed imparted to the friction wheel by a given rate of rotation of friction disks 250. The extreme inward position of friction wheel 252 (short focal length) is indicated in dot-dash lines in Fig. 9. Cam member 300 is so shaped and the parts are so related that in the course of movement of the lens members from long focal length to short focal length position, the effective point of driving enegagement between friction disks 250 and friction wheel 252 moves inwardly on disks 250 to decrease the rate of speed imparted to the friction wheel 252 and lens members driven thereby to the extent proper to compensate for the appearance of increased rate of change of magnification of the image otherwise encountered at the short focal length end of the operating range of the lens.

The variable opening diaphragm of the lens system is indicated somewhat diagrammatically at 25 in Fig. 4, being positioned between lens elements 17 and 18 of positive lens member 11. Since variable opening diaphragms are well known, the details of the diaphragm are not here illustrated. There is shown, however, a diphragm operating ring 340 surrounding and rotatable on the lens mount sleeve 53 in which diaphragm 25 is located, and it will be understood that suitable means are provided whereby rotation of this ring on lens mount sleeve 53 will cause opening and closing of the diaphragm between such limits as are indicated in Figs. 1 and 2.

Means are provided for automatically controlling the opening of this diaphragm as the lens system is moved between long and short focal length positions, and also for setting the diaphragm to different selected effective relative apertures Secured to diaphragm operating ring 340 is an arcuate plate 341, concentric with the lens axis, and provided with an upwardly extending gear sector portion 342. This gear sector 342 meshes with a long spur gear 343 journalled in bearings 344 and 345 carried by the removable cover plate 36 of the casing. The length of this gear 343 is such that gear sector 341 remains in mesh therewith throughout the range of movement of lens member 11. Gear 343 is integral with a shaft 346 driving bevel gear 347 which meshes with a bevel gear 348 on a shaft 349 journalled in suitable bearings provided in a boss 352 formed integrally with and extending from casing cover 36. Mounted on the outer end of this shaft 349 is a manual operating knob 353, provided at its base with a flange portion 354 inscribed with a scale 355 calibrated in effective relative apertures (see Fig. 6). Rotatably mounted on shaft 349 between the outer end of boss 352 and the inner surface of knob 353 is an indicator disk provided with an inwardly turned flange portion 358, and inscribed on this flange portion 358 is an indicator arrow 359 pointing to the scale 355 on knob 353. This indicator member 358 may be set in different rotative positions by loosening a thumb screw 360 which is screwthreaded in member 358 and engages boss 352, and resetting it in desired position. The purpose of this adjustment will appear later.

It will now be evident that diaphragm control ring 340, and therefore the opening of diaphragm 25 controlled by said ring, is operable by rotation of manual knob 353. This adjustment is ordinarily made with the lens system in the illustrated long focal length position, and is made as follows: Thumb screw 360 is loosened and member 358 set with its indicating arrow 359 opposite an indicating mark 364 inscribed on boss 352 (see Fig. 6). The scale 355 calibrated on knob 353 is such as to correspond with arrow 359 when member 358 is in this adjusted position (the lens system being understood to be in long focal length position), and the knob may then be set to the relative aperture desired. The relative aperture established by diaphragm 25 is then correct for the long focal length position of the lens.

To maintain the relative aperture constant as the lens system is then moved to short focal length position, the following automatic provisions are made. Slidably mounted on arcuate plate 341 is an arcuate plate 370 (see Figs. 4, 5 and 6), provided with arcuate slots 371 through which pass studs 372 screwthreaded at their inner ends into arcuate plate 341. Coil springs 373 are provided between the heads of studs 372 and plate 370 to press plate 370 into relatively tight frictional engagement with plate 341. Plate 370 is thus slidable on plate 341, but is yieldingly held in any given position of adjustment by virtue of the pressure exerted by springs 373.

Plate 370 has extending therefrom a fork member 380 (see Figs. 5 and 6), which engages a cam rod 381 mounted in an annular position on brackets 382 and 383 secured to the side wall 118 of the case.

As the lens system is moved from long focal length position toward short focal length position, the lens member 11 carrying the diaphragm mechanism moves rearwardly in the case, and fork member 380 is caused to move downwardly on the downwardly inclined cam rod 381. This causes arcuate plate 370 to rotate in a counter-clockwise direction, as viewed in Fig. 6, and to move arcuate plate 341 with it, the spring pressure of springs 373 being sufficient to prevent slippage between plates 370 and 341 at this time. Thus the diaphragm operating ring 340 to which plate 341 is secured is caused to rotate to close diaphragm 25, and the angular direction of cam rod 381 is such as to cause the diaphragm to close at such a rate in comparison with the change of focal length of the system as to maintain the effective aperture of the system constant between the long and short focal length positions of the lens members. Thus, assuming the effective aperture to have been set at f/2.7 at long focal length, as in Fig. 1, the operation of the mechanism is such as gradually to close the diaphragm as the lens members are moved to the short focal length position of Fig. 2, maintaining the effective aperture at f/2.7 throughout the entire range of movement.

It may be here noted that operation of knob 353 to adjust the effective aperture ratio of the lens causes arcuate plate 341 to slide on arcuate plate 370, which is held by the engagement of its fork 380 with cam rod 381, the pressure exerted by springs 373 being such as to permit comparatively free sliding action of said members while the aperture is being adjusted by rotation of said knob, but being sufficient to transmit motion from plate 370 to plate 341 during longitudinal movement of the lens members as focal length is changed.

It will be evident that in the course of movement of the lens system from long to short focal length position, the gear segment 342 on arcuate plate 341 is moved and acts through the gear train 343, 347 and 348 to rotate manual adjustment knob 353. Accordingly, if indicator ring 358 has been set in the manner previously described, with its indicating arrow 359 opposite indication mark 354 on boss 352, the effective aperture ratio scale 355 inscribed on the knob will read correctly only at the initial long focal length position. If it be desired to adjust the effective aperture of the system in some position other than at long focal length, the procedure is as follows: Assuming that, with indicating ring 358 in the normal position of Fig. 6, the knob 353 was previously adjusted, with the lens system at long focal length, to some particular effective aperture, as f/2.7, and that the lens members are now at some position other than at long focal length, the thumb screw 360 is loosened and ring 358 rotated and reset by means of screw 360 with its arrow 359 again pointing to f/2.7 on scale 355. The indicating arrow 359 is then correct for that focal length position of the lens system, and the knob may be adjusted to whatever effective aperture may be desired by reference to said arrow.

Figure 6:
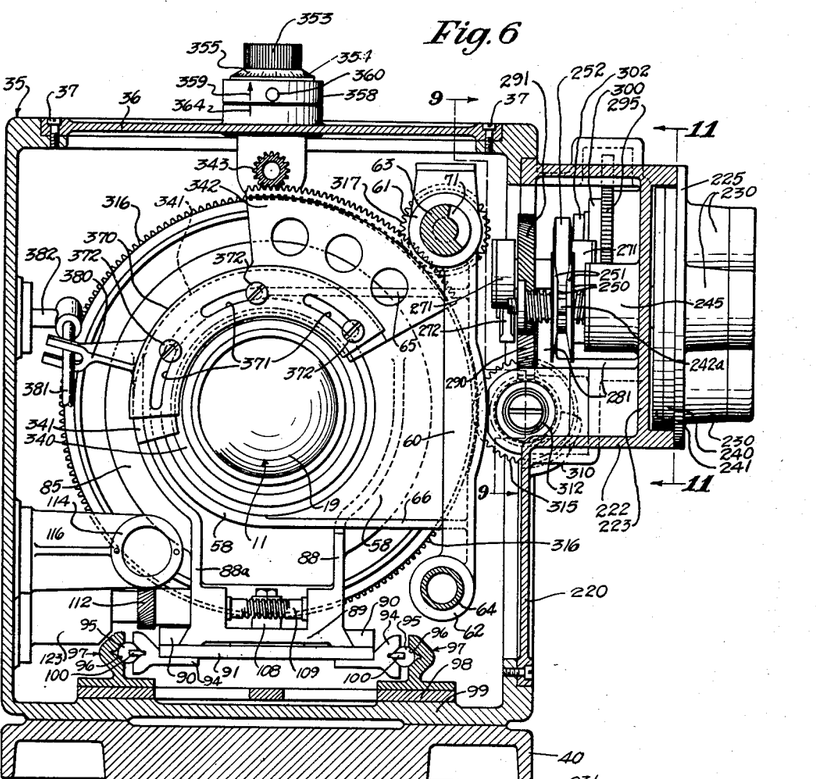
Fig. 6 is a vertical transverse section taken as indicated by arrows 6—6 on Fig. 5.

Preferably, and usually, the adjustment for effective relative aperture is made with indicating ring 358 in the position 353 of Fig. 6, and with the lens system at long focal length. The knob then sets the effective aperture of the lens system, and the automatic mechanism described maintains that effective relative aperture throughout the focal length range of the system by closing down the diaphragm as the system moves to its short focal length position. As explained, however, it is possible, if desired, to reset the relative effective aperture at any focal length position within the range of operation of the lens.

Figure 12:
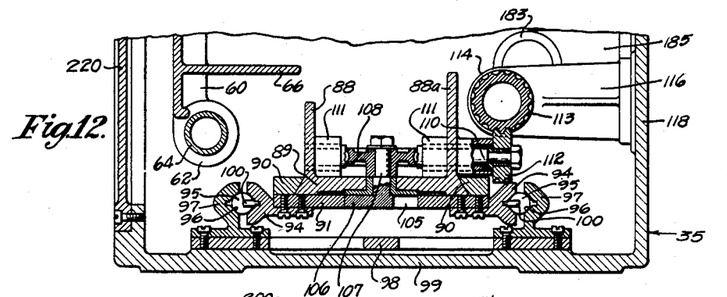
Fig. 12 is a detail section taken on line 12—12 of Fig. 4.
Figure 13:
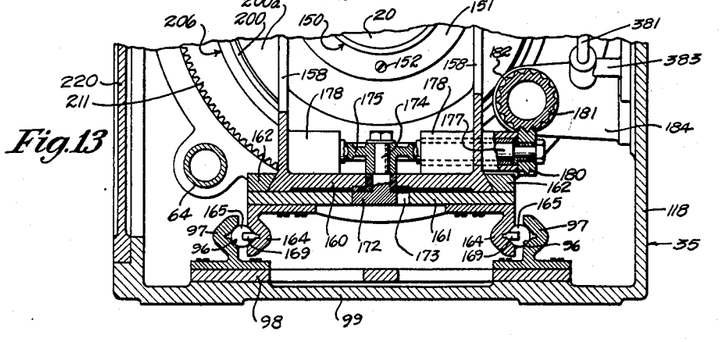
Fig. 13 is a detail section taken on line 13—13 of Fig. 4.
Figure 14:
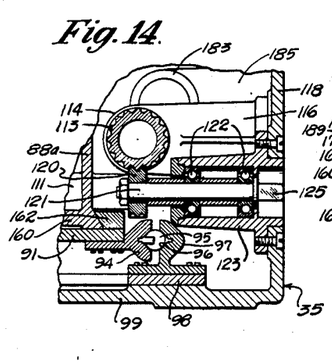
Fig. 14 is a vertical detail section taken on line 14—14 of Fig. 5.
Figure 15:
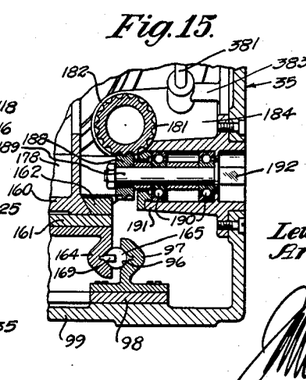
Fig. 15 is a vertical detail section taken on line 15—15 of Fig. 5.

The provisions for adjustment to different object distances are as follows: The lens system is shown in the drawings set for an object distance of infinity. It will be noted from Figs. 4, 12, and 13 that the adjustment eccentrics 106 and 172 for lens members 10 and 12, respectively, are so disposed at such time as to place said lens members at the mid-points of their forward and rearward adjustment movements on their respective carriages. With the lens members 10 and 12 so positioned on their carriages, the lens system is first moved to its short focal length position (Fig. 2), and the lens system as a whole is then moved back and forth with reference to the focal plane of the camera until the best possible focus is obtained. For this purpose, the entire lens case may be moved back and forth with reference to the camera, and the position of best focus may be ascertained by observing the image formed at the focal plane of the camera on a ground glass, as in any usual manner. The lens system is then moved to its long focal length position (Fig. 4), and the two lens members 10 and 12 are then individually adjusted back and forth until the best possible focus is obtained. These final adjustment operations are performed by rotation of the previously described crank shafts 121 and 189 which operate eccentrics 106 and 172 and so regulate the longitudinal positions of lens members 10 and 12 with reference to the cam driven longitudinally slidable members 91 and 161 of their respective carriages. The system is then in the best possible focus for both long and short focal length, and the scene may be photographed. It may be stated, however, that while it is ordinarily unnecessary to make individual focusing adjustments of lens members 10 and 12 for the short focal length position of the system, certain unusual shots may require such accuracy of focusing at short focal length that individual focusing of lens members 10 and 12, in addition to movement of the entire system as a whole with reference to the focal plane, will be found useful. In such instances it is usually advisable to proceed as outlined above, but to make several final adjustments of members 10 or 12, or both, at both the long and short focal length positions of the system.

We have now described and illustrated one preferred specific embodiment of our broad invention; it is to be understood, however, that various modifications of the illustrative lens system as well as of the mechanical lens movement and adjustment members may be made within the scope of the present invention, and all such modifications are contemplated as falling within the spirit and scope of the invention as claimed.

We claim:

1. In a variable equivalent focal length lens, the combination of a front negative member, and a back member axially movable with relation to the front negative member consisting of relatively movable forward and rearward components of positive power in combination, means for supporting and axially moving said negative member and said positive member components with reference to each other in a predetermined relation in such manner as gradually to increase or decrease the focal length of the combination, means for adjusting the separative distance between the front negative member and the forward component of the positive independently of the separative distance between the two components of the positive member, and means for adjusting the separative distance between the two components of the positive member independently of the separative distance between the front negative member and the forward component of the positive.

2. In a variable equivalent focal length lens system, the combination of a front negative component, and a back member consisting of relatively movable forward and rearward components of positive power in combination, separate lens carriages for said lens components adapted to be moved in a manner to carry said lens components along a common optical axis, the carriages for the negative component and the back positive component each comprising a lens supporting part and a carrying part relatively adjustably movable thereon in a direction parallel to the optical axis of the system, and mechanism for effecting relative movements of the lens components of a nature to effect a gradual change of focal length of the system, said mechanism being operatively connected with the carriage for the forward positive lens component and with the carrying members of the carriages for the negative and forward positive lens components.

3. In a variable equivalent focal length lens, the combination of a case, a plurality of axially alined lens members mounted in said case, means for supporting said lens members in said case for relative axial movement, an adjustable iris diaphragm associated with one of said lens members, a diaphragm control member operatively connected with said diaphragm and adapted to be moved to open and close said diaphragm, said operating member being carried with said lens member in its axial adjustment movement, a manual effective aperture control member mounted for movement on the case, an operative driving train interconnecting said manual member and said diaphragm control member throughout all positions of axial adjustment movement of the lens members, and means for automatically opening and closing said diaphragm as the lens members are moved axially back and forth in the case, said means including a cam member supported on the case, means supported and longitudinally carried with the lens member that has the diaphragm and operatively moved by said cam as the lens member is axially moved, and a friction slip driving connection between said last mentioned means and the diaphragm control member adapted to transmit motion from said cam to said diaphragm control member but arranged to slip when said manual effective aperture control member is operated.

4. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising a flint and crown doublet of meniscus shape facing the object and a meniscus lens positioned adjacent said doublet, the middle group comprising four air separated lenses of which the first lens toward the object is a double convex positive lens of crown glass, the second is a double concave dispersive lens of flint glass, the third is a double convex crown lens and the fourth is a crown meniscus with its convex surface facing the focal plane, said back group comprising a crown and flint doublet, the spacing between the front and middle groups being variable from a distance approximately one-third the short focal length of the system at long focal length to a distance approximately slightly greater than the long focal length of the system at short focal length, and the spacing between the middle and back groups being variable from a distance approximately slightly greater than the long focal length of the system at long focal length to a distance approximately one-quarter of the short focal length of the system at short focal length.

5. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising a flint and crown doublet of meniscus shape facing the object and a meniscus lens positioned adjacent said doublet, the middle group comprising four air separated lenses of which the first lens toward the object is a double convex positive lens of crown glass, the second is a double concave dispersive lens of flint glass, the third is a double convex crown lens and the fourth is a crown meniscus with its convex surface facing the focal plane, said back group comprising a crown and flint doublet.

6. A variable equivalent focal length lens system, comprising three relatviely axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising a flint and crown doublet of meniscus shape facing the object and a meniscus lens positioned adjacent said doublet, the middle group comprising a negative member of flint glass, a single positive member on one side of said negative member and two weakly curved positive members on the other side of said negative member, said back group comprising a crown and flint doublet.

7. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising a flint and crown doublet of meniscus shape facing the object and a meniscus lens positioned adjacent said doublet, the middle group comprising spaced positive members and an intermediate negative member, said back group comprising a crown and flint doublet.

8. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said middle and back groups being of approximately equal positive powers, said front group comprising a flint and crown doublet of meniscus shape facing the object and a meniscus lens positioned adjacent said doublet, the middle group comprising four air separated lens of which the first lens toward the object is a double convex positive lens of crown glass, the second is a double concave dispersive lens of flint glass, the third is a double convex crown lens and the fourth is a crown meniscus with its convex surface facing the focal plane, said back group comprising a crown and flint doublet, the spacing between the front and middle groups being variable from a distance approximately one-third the short focal length of the system at long focal length to a distance approximately slightly greater than the long focal length of the system at short focal length, and the spacing between the middle and back groups being variable from a distance approximately slightly greater than the long focal length of the system at long focal length to a distance approximately one-quarter of the short focal length of the system at short focal length.

9. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising a flint and crown doublet of meniscus shape facing the object and a meniscus lens positioned adjacent said doublet, the middle group comprising four air separated lenses of which the first lens toward the object is a double convex positive lens of crown glass, the second is a double concave dispersive lens of flint glass, the third is a double convex crown lens and the fourth is a crown meniscus with its convex surface facing the focal plane, and said back group comprising a cemented crown and flint glass color compensating combination.

10. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising two meniscus pieces with their exterior concave surfaces facing toward the focal plane, the front meniscus comprising a cemented doublet consisting of a front element of flint glass of high index and high dispersion and a back element of crown glass of low index and low dispersion, the cemented surface of said doublet being weakly curved and concave toward the incident light, and the back meniscus piece being of flint glass of high index and high dispersion, said front group comprising a flint and crown doublet of meniscus shape facing the object and a meniscus lens positioned adjacent said doublet, the middle group comprising four air separated lenses of which the first lens toward the object is a double convex positive lens of crown glass, the second is a double concave dispersive lens of flint glass, the third is a double convex crown lens and the fourth is a crown meniscus with its convex surface facing the focal plane, said back group comprising a crown and flint doublet, the spacing between the front and middle groups being variable from a distance approximately one-third the short focal length of the system at long focal length to a distance approximately slightly greater than the long focal length of the system at short focal length, and the spacing between the middle and back groups being variable from a distance approximately slightly greater than the long focal length of the system at long focal length to a distance approximately one-quarter of the short focal length of the system at short focal length.

11. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, and said positive combination having a focal length substantially twice the short focal length of the system, said front group comprising two meniscus pieces with their exterior concave surfaces facing toward the focal plane, the front meniscus comprising a cemented doublet consisting of a front element of flint glass of high index and high dispersion and a back element of crown glass of low index and low dispersion, the cemented surface of said doublet being weakly curved and concave toward the incident light, and the back meniscus piece being of flint glass of high index and high dispersion, said front group comprising a flint and crown doublet of meniscus shape facing the object and a meniscus lens positioned adjacent said doublet, the middle group comprising four air separated lenses of which the first lens toward the object is a double convex positive lens of crown glass, the second is a double concave dispersive lens of flint glass, the third is a double convex crown lens and the fourth is a crown meniscus with its convex surface facing the focal plane, said back group comprising a crown and flint doublet.

12. A variable equivalent focal length lens system, comprising three relatively axially movable lens groups in axial alinement, the front group comprising a negative member and the middle and back groups being of positive power in combination, said front negative group having a focal length numerically substantially at least twice that of the short equivalent focal length of the system, but less than the long focal length of the system, and said positive combination having a focal length substantially twice the short focal length of the system, the spacing between the front and middle groups being variable from a distance approximately one-third the short focal length of the system at long focal length to a distance approximately slightly greater than the long focal length of the system at short focal length, and the spacing between the middle and back groups being variable from a distance approximately slightly greater than the long focal length of the system at long focal length to a distance approximately one-quarter of the short focal length of the system at short focal length.

13. A variable equivalent focal length lens system, comprising three relatively axially movable lens groups in axial alinement, the front group comprising a negative member and the middle and back groups being of positive power in combination, said positive combination in all positions of axial adjustment of the lens viewing the virtual image formed by the negative group, said front group of the positive combination being axially movable relatively to said negative group between a near long focal length position and a more distant short focal length position, and said rear positive group being axially movable with relation to said front positive group between a distant long focal length position and a closer short focal length position, means supporting said lens groups for relative axial movement, and lens moving means connected with said lens groups operable to concurrently increase the axial distance between the negative group and the front positive group and decrease the axial distance between the two positive groups to shorten the focal length of the system, and to concurrently decrease the axial distance between the negative group and the front positive group and increase the axial distance between the two positive groups to lengthen the focal length of the system.

LEWIS L. MELLOR.
ARTHUR ZAUGG.